May 29, 1956 E. H. GATZERT 2,748,194

DROP-BACK SELECTOR

Filed May 2, 1955 5 Sheets-Sheet 1

INVENTOR.
ERNEST H. GATZERT
BY Henry H. Gage
AGENT

DROP-BACK SELECTOR

Filed May 2, 1955 5 Sheets-Sheet 2

May 29, 1956 E. H. GATZERT 2,748,194

DROP-BACK SELECTOR

Filed May 2, 1955 5 Sheets-Sheet 5

United States Patent Office 2,748,194
Patented May 29, 1956

2,748,194

DROP-BACK SELECTOR

Ernest H. Gatzert, Rochester, N. Y., assignor, by mesne assignments, to General Dynamics Corporation, a corporation of Delaware Application May 2, 1955, Serial No. 505,463

18 Claims. (Cl. 179—18)

My invention relates to selector circuits suitbale for use in a telephone system, and more particularly to selectors of the drop-back type.

In the past, it has been the practice to provide selectors of the drop-back type which are equipped to absorb one or more selective signals which represent all or a part of an office code in order to allow calling subscribers to have access to the trunks which terminate in the various levels to which the selector has access. In the case of some levels, it may be desirable to allow a subscriber to have access to particular levels either prior to or subsequent to the dialing of the office code. A selector of this type is shown and described in the copending application of W. W. Pharis, entitled, "Local First Selector Circuit," Serial No. 420,778, filled April 14, 1954, assigned to the same assignee as the present application. In such a selector, a problem is presented when it is desired to limit the access to the trunks in such a particular level to lines of a certain class since the levels must be so chosen that they do not include the levels which are represented by the selective signals which form the office code.

Therefore, it is an object of the present invention to provide a new and improved drop-back type selector.

Another object of the invention is to provide a drop-back type selector having access to a particular level over which calls from any one of a restricted class of lines may not be extended either prior to or subsequent to the transmission of the office code or unlocking signals.

Another object of my invention is to provide a drop-back selector having access to a particular level over which a connection may not be extended from any one of a restricted class of calling lines either prior to or subsequent to the transmission of the office code or unlocking signals when the office code or unlocking signals include a signal which is effective to advance the selector to that particular level.

I accomplish these and other objects by providing in a telephone system comprising a group of lines a selector of the drop-back type comprising a switch having a set of wipers. Primary means within the selector are operative in response to directive signals from any one of the calling lines for advancing the wipers to any one of the levels to which the switch has access. Secondary means are thereafter effective for advancing the wipers within any one of the levels in a hunting operation. In order to render effective the hunting means, means for recording or registering an unlocking series of directive signals is provided. The registering means is arranged to be operative in response to each of a series of primary advances of the wipers to certain of the levels, the advances being caused by each of the unlocking signals in a corresponding series of recording operations. Means operative responsive to each operation of the registering means is provided for restoring the set of wipers to its normal position at the conclusion of each primary advance caused by the unlocking signals. Restricting means is provided to be operative responsive to the extension of a connection from any one of the lines of the restricted class and to the primary advance of the wipers to a particular level which is to be restricted. Means may be operated in response to an operation of the registering means preceding the operation caused by the primary movement of the wipers to the restricted level during the office signal registering operation for rendering the restricting means inoperative. Other means for rendering the restricting means operative becomes effective after the registering means has recorded the signal representing the restricted level.

Further objects and advantages of my invention will become apparent as the following description proceeds, and features of novelty which characterize the invention will be pointed out with particularly in the claims annexed to and forming a part of this specification.

For a better understanding of my invention, reference may be had to the accompanying drawings in which.

Figures 1, 2:
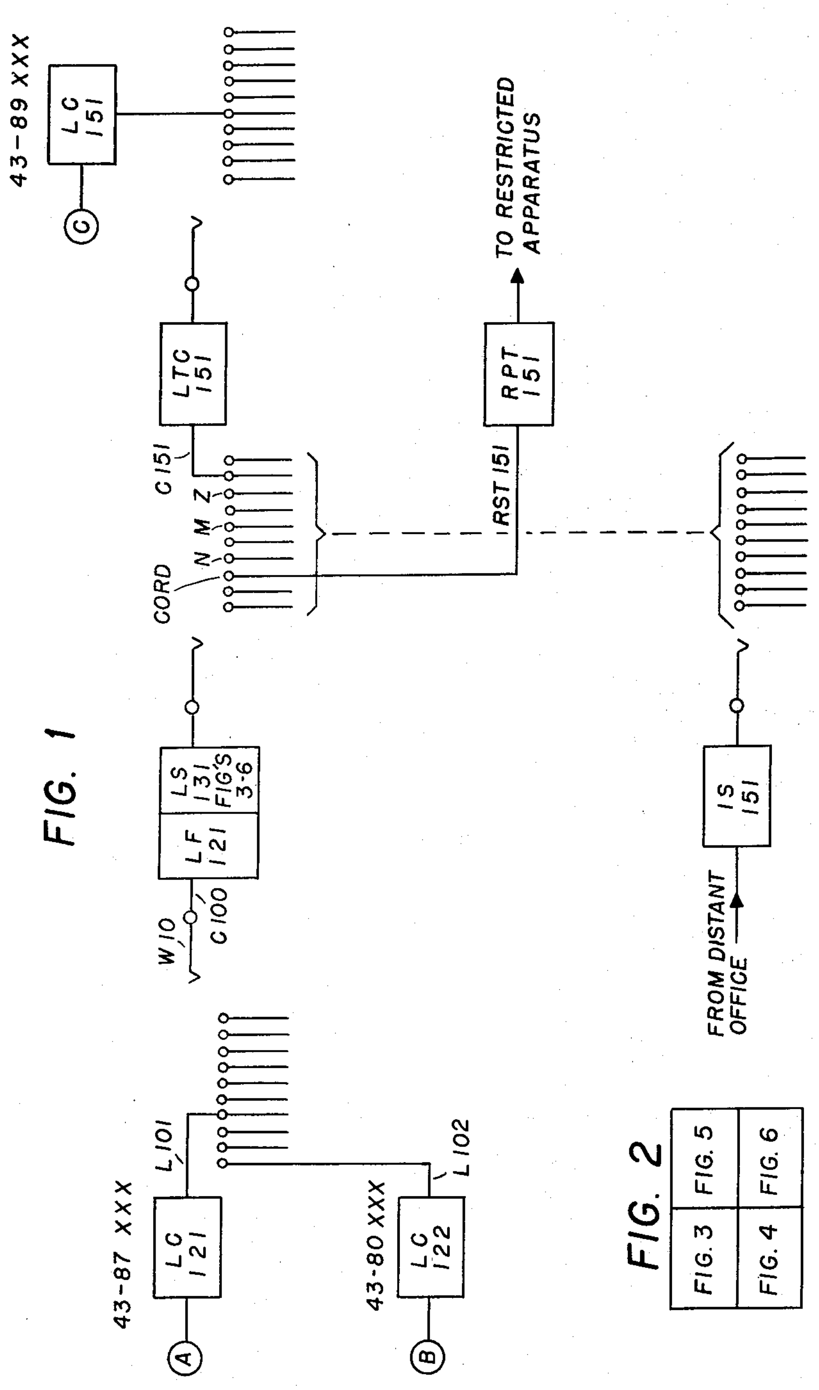
Fig. 1 shows a schematic representation of a system in which the present invention may be incorporated.
Fig. 2 shows the relationship between Figs. 3 to 6, inclusive.

The apparatus referred to in the following description is made to function from power supplied from a source such as a battery. The most positive plate of the battery is connected to ground and is referred to hereafter as "ground" and in the drawings as "(+)"; the most negative ungrounded plate of the battery is referred to as "battery" and in the drawings as "(−)."

Because the present invention lies in the local selector circuit and because the other apparatus referred to in the following description functions in any of a number of ways well understood by those skilled in the telephone art, the description of the operation of the apparatus functioning with the local selector is confined to general terms except in those instances where the other apparatus contributes directly to the operation of the local selector.

In the system contemplated, it is possible to place a call from a distant office station to a station in the local office shown in Fig. 1, such as station C, over a switching link which includes incoming selector IS151. The switching equipment at the distant office (not shown) responds to directive signals comprising an office code individual to the office of called line C to extend a connection from the distant office to selector IS151. In the system shown in Fig. 1, assume that such an office code comprises the digits "438." Subsequent to the extension of a connection to selector IS151, transmission of the line selecting signals of called line C over the built-up connection is effective to cause incoming selector IS151 to be advanced to select an idle local and toll connector such as LTC151 in the proper thousands group and to thereafter direct connector LTC151 to the terminals of the line circuit LC151 associated with called station C.

Referring next to the extension of a connection from a local calling station such as A through the local office switch train, in the event the connection is to be extended to a called station such as C previously referred to, it is necessary in order to procure a uniform numbering system to make it possible for the subscriber at station A to dial all of the directive signals of the office code and line selecting code of the called line station C. In such an operation, the office code signals are unnecessary in that no office selecting switches are required. For this reason, local first selectors such as LS131 are arranged to absorb the office selecting digits in an unlocking operation and are thereafter responsive to the first of the line selecting digits to select a local and toll connector such as LTC151. Connector LTC151 is thereupon caused to further extend the connection to the terminals of called station C through line circuit LC151 in the manner referred to previously. These and other functions of selector LS131 are described in the detailed description which follows.

Figure 3:
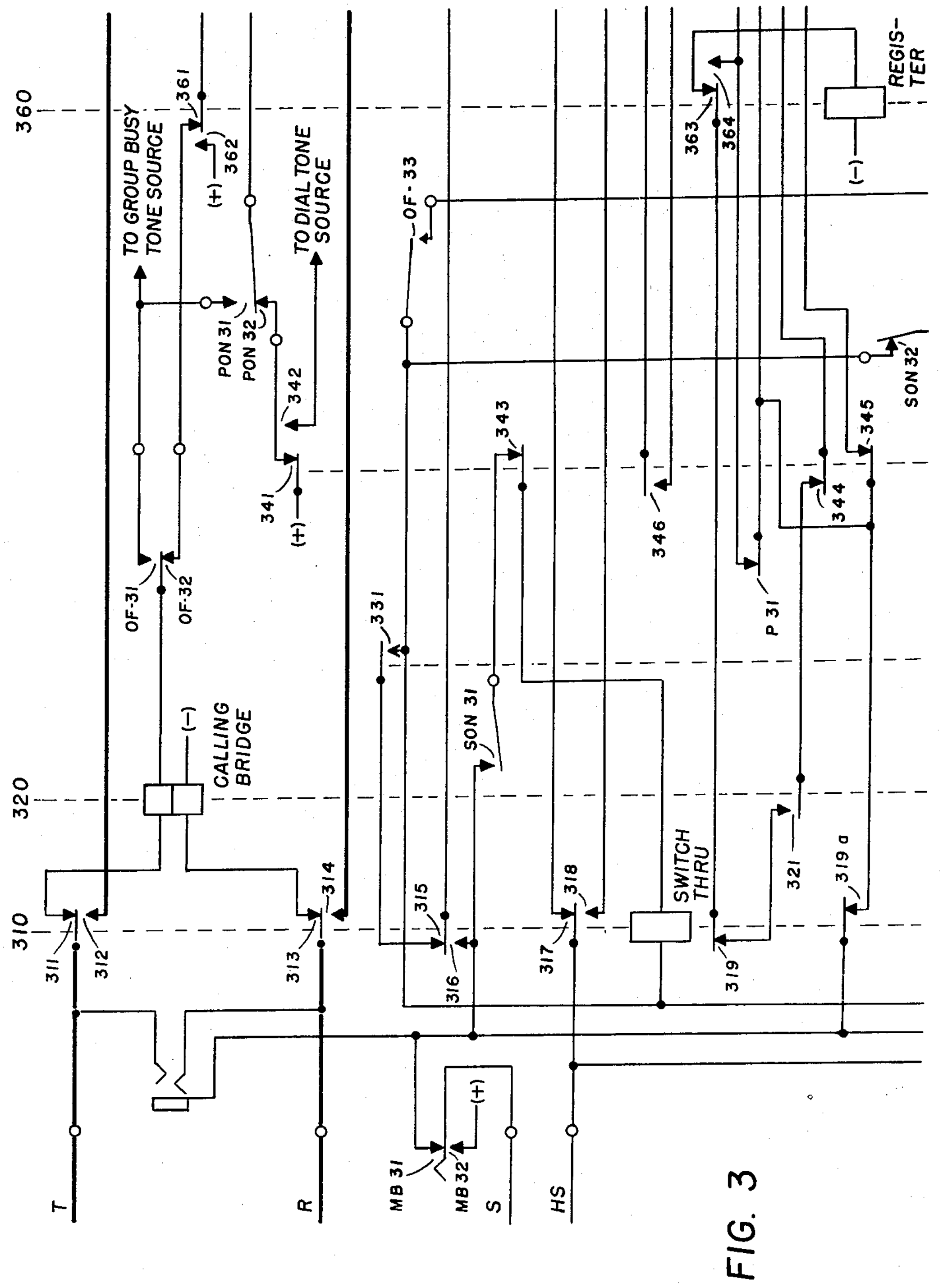
Figs. 3–6 show a local first selector.
Figure 4:
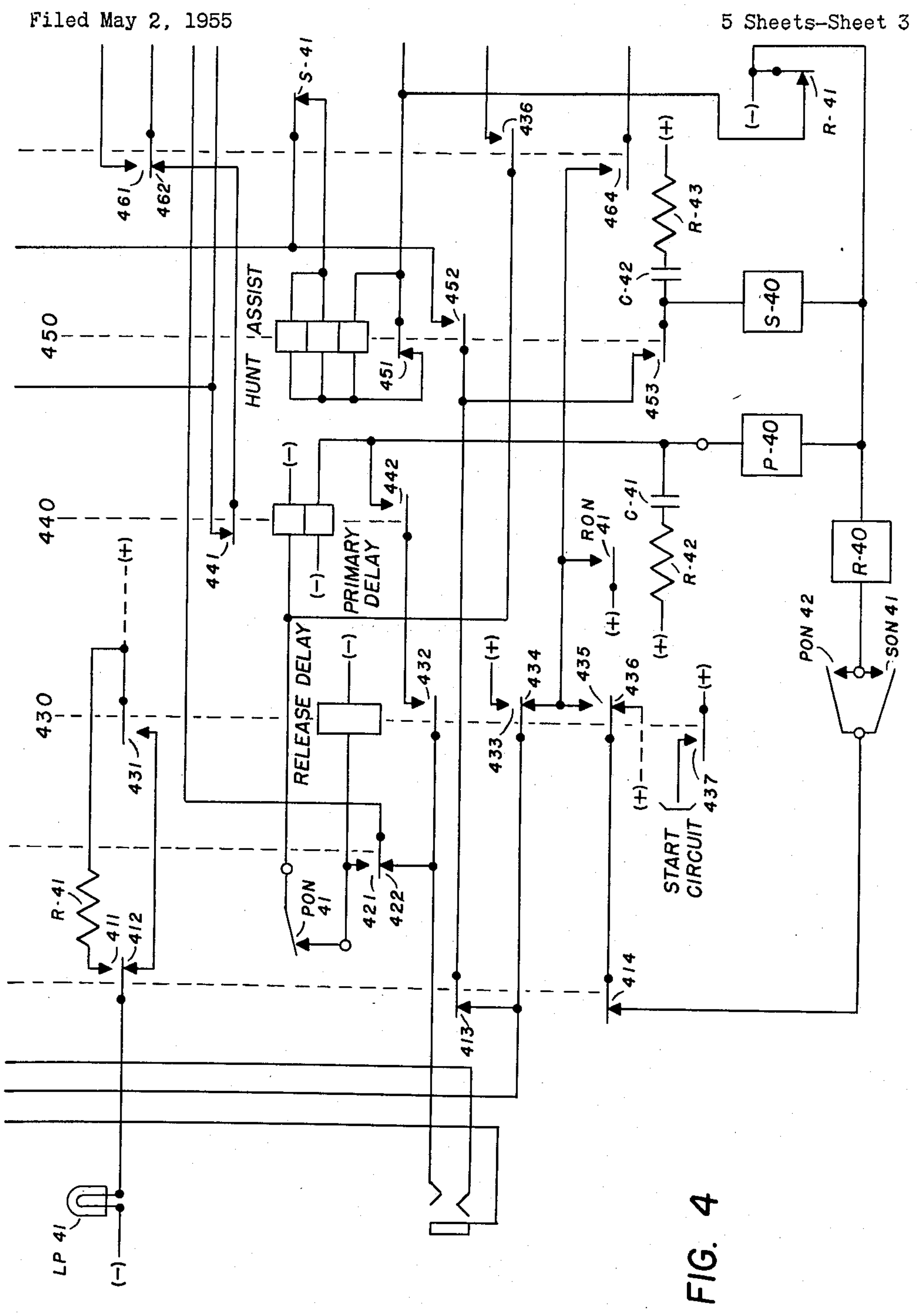
Figure 5:
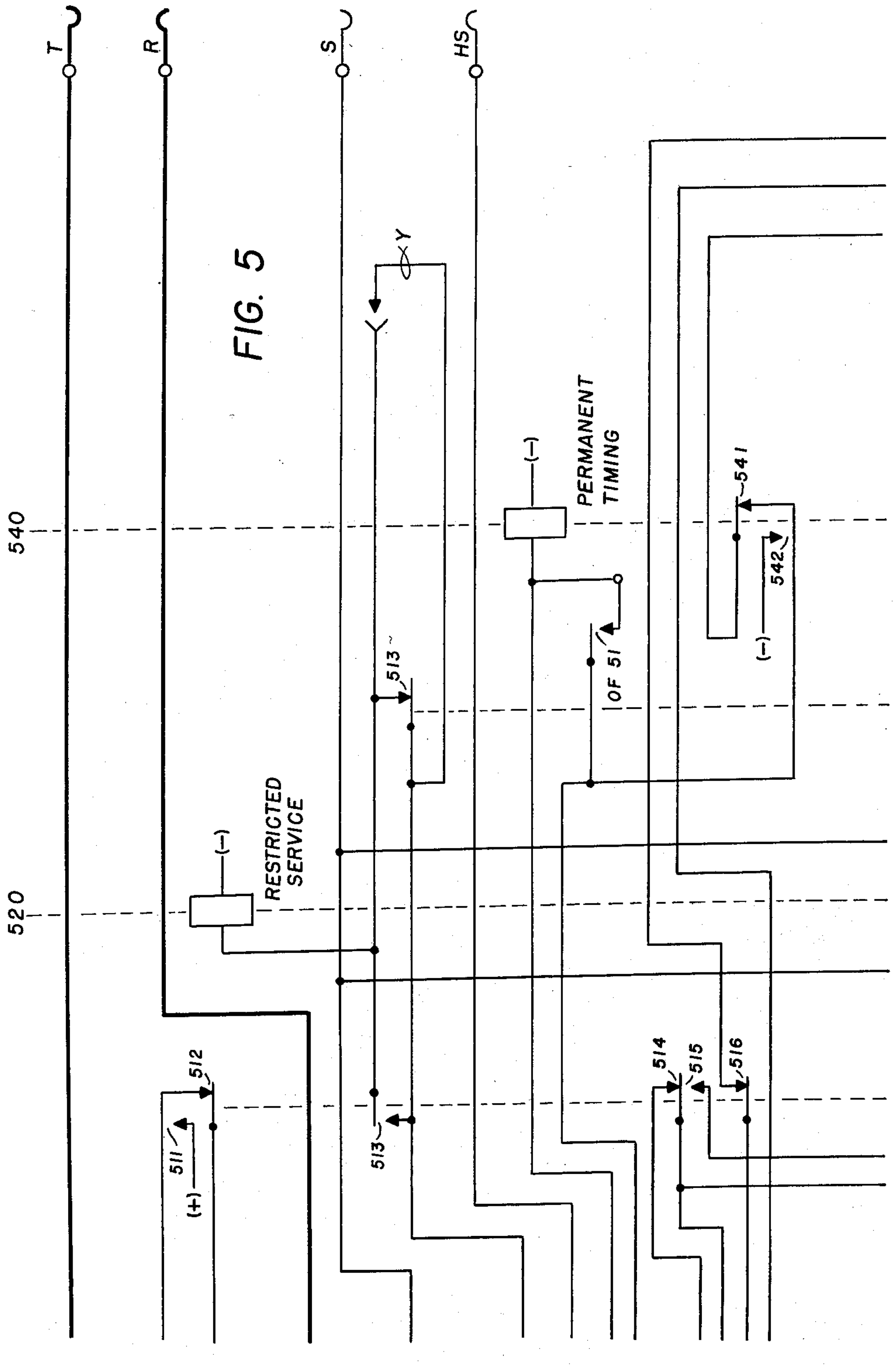
Figure 6:
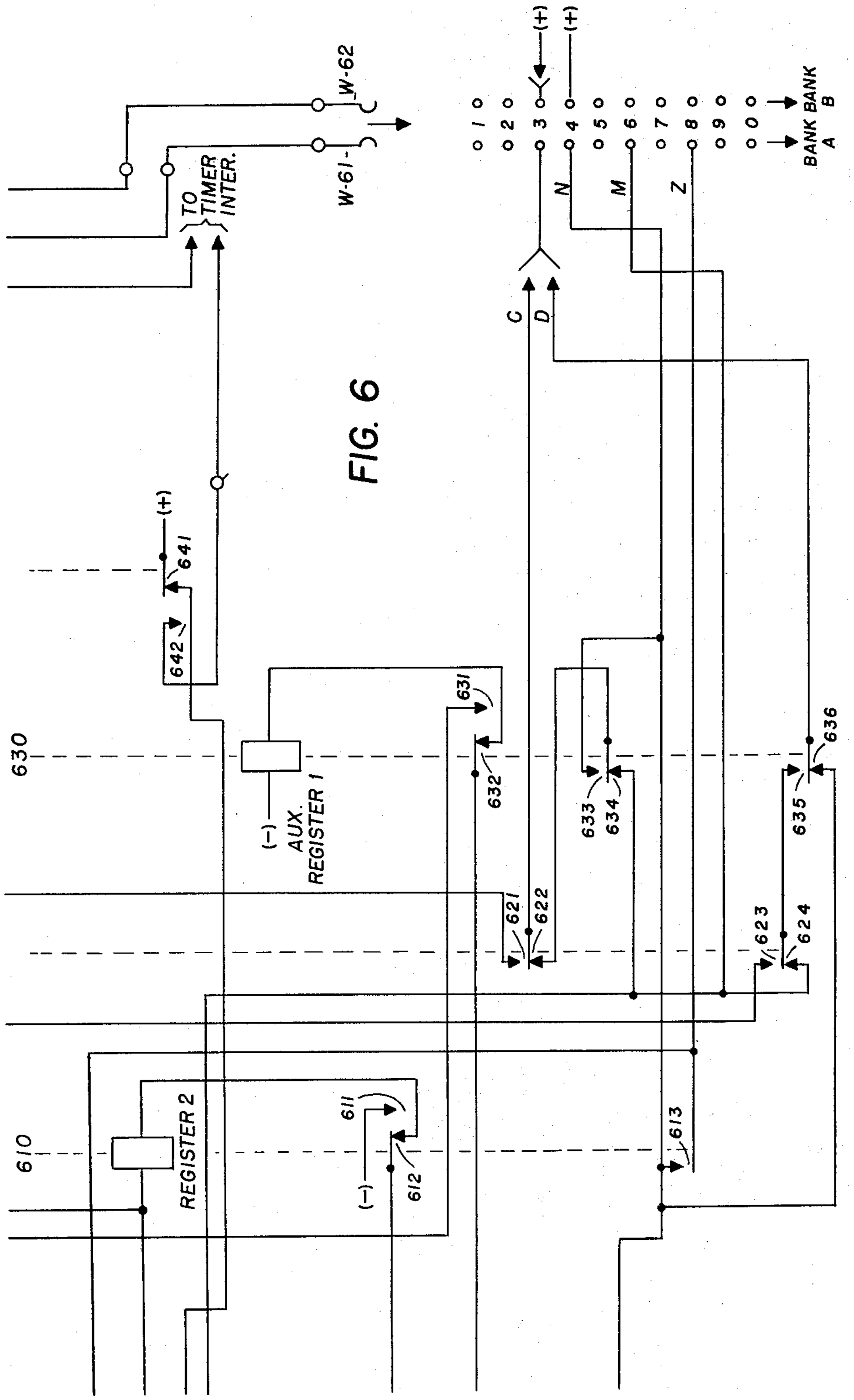

To originate a call within the local office from a calling station A, the telephone at station A is removed from its hookswitch to energize line circuit LC121. The energization of line circuit LC121 is effective to cause the wipers, shown collectively as W10 of line finder LF121, to be advanced by means not shown to the terminals in the finder multiple of calling line circuit LC121 thereby extending a connection from calling station A over the conductors of line L101 through the talking conductors of line finder LF121 which are shown collectively as C100 to the talking conductors T and R of the local first selector LS131 shown in Fig. 3. Extension of the connection from station A to selector LS131 is effective for completing an operating circuit for calling bridge relay 320 as follows: from ground through break contacts 341 on normal relay 440, break contacts PON32 of the unoperated primary off-normal springs, break contacts 512 on unoperated relay 610, break contacts 361 on unoperated relay 360, break contacts OF32 of the overflow contacts, the upper winding of calling bridge relay 320, break contacts 311 of unoperated relay 310, conductor T of selector LS131 and finder LF131, one of the conductors of line L201, the well known dial contacts of calling station A, the other conductor of line L201, conductor R of finder LF131 and selector LS131, break contacts 313 of unoperated relay 310, and the lower winding of calling bridge relay 320 to battery. Relay 320 thereupon operates and is thereafter effective for repeating signals comprising trains of impulses which are caused by a systematic opening and closing of the contacts of the dial at calling station A. The operation of relay 300 is effective to operate release delay relay 430 by completing an operating circuit from ground through break contacts 641, now-operated make contacts 421, and the winding of relay 430 to battery. Relay 430 thereupon operates.

Operation of release delay relay 430 is effective to supply a holding ground over the sleeve conductor S of selector LS131 to hold line finder LF121 in its operated position and to mark line circuit LC121 busy to other equipment from ground through now-operated make contacts 433, closed contacts MB31 on the unoperated make busy key to conductor S. Operation of relay 430 is also effective for completing an operating circuit for primary delay relay 440 from ground through break contacts 641, now-closed make contacts 421, unoperated contacts PON41 of the primary off-normal switches, and the upper winding of relay 440 to battery. Relay 440 thereupon operates. The operation of relay 440 is effective to transfer the above-traced operating loop for calling bridge relay 320 from its connection to ground at contacts 341 to a low impedance grounded dial tone source through make contacts 342 thereby supplying a dial tone to the calling station A to indicate that the selector is ready to receive directive signals from the dial of station A.

The transmission of a train of impulses comprising the first directive signal of the office code of called station C is effective to release and reoperate calling bridge relay 320 one time corresponding to each impulse in the train. Release relay 430, being a slow release type, remains operated during the time that its operating circuit is opened at contacts 421 by the release of relay 320 during the pulsing operation; consequently, relay 430 remains in operated condition throughout the transmission of trains of impulses. Also responsive to each release of calling bridge relay 320, a circuit is completed for operating the primary means comprising magnet PM40 for advancing the wipers T, R, S and HS of selector LS131 in their primary direction to any of the plurality of levels to which the selector has access; the circuit is completed as follows: from ground through now-closed break contacts 422, now-closed break contacts 432 on relay 430 and 442 on relay 440, and the winding of magnet P40 to battery. Each energization of magnet P40 is effective to advance the wipers away from their normal position by one step so that the wipers are advanced to the level corresponding to the number of impulses in the train.

During the repetition of impulses, a circuit is completed for maintaining primary delay relay 440 in its operated condition from ground through now-closed contacts 422 on calling bridge relay 320, make contacts 432 on relay 430 and 442 on relay 440, and the lower winding of relay 440 to battery to insure the continued operation of relay 440 throughout the transmission of a train of impulses.

The advance of the wipers T, R, S and HS away from their normal position is effective to operate the primary off-normal contacts and thereby open the previously described operating circuit of primary delay relay 440 at contacts PON41. Consequently, relay 440 is released at the conclusion of a primary movement of the wipers T, R, S and HS after the previously described holding circuit is opened at contacts 422 on calling bridge relay 320 at the conclusion of the impulse repeating operation. Also operated responsive to the primary movement of the wipers T, R, S and HS are the level marking means comprising wipers W61 and W62 which are moved one step away from their normal positions over banks of terminals A and B, respectively, for each step in the primary direction taken by the wipers T, R, S and HS away from their normal positions. The effect of the operation of these level marking means is next explained.

Assuming that the subscriber at calling station A has caused the dial at station A to transmit a signal representing the first digit "4" of the local office code, the wipers T, R, S and HS are advanced to the fourth level in the previously described manner which is also effective to move wipers W61 and W62 to the fourth set of contacts in the bank A and bank B. After the release of primary delay relay 440 at the conclusion of the primary movement, a circuit is completed for operating register 1 relay 360 responsive to the operation of the level marking means over the following circuit: from ground through the fourth contacts of bank B, wiper W62, break contacts 516 on unoperated relay 610, break contacts 344 on now-released relay 440, make contacts 321 on operated relay 320, break contacts 319 on released relay 310, break contacts 363, and the winding of relay 360 to battery. Relay 360 thereupon operates and completes for itself a locking circuit from battery through the winding of relay 360, make contacts 364, break contacts 514 on released relay 610, break contacts 319*a* on released relay 310, and make contacts 433 on operated relay 430 to ground. It is to be noted that break contacts 514 in the locking circuit is paralleled by primary interrupter contacts P31; the use of the latter contacts is to be explained presently.

Operation of register 1 relay 360 is effective for operating releasing means comprising release magnet R40 which are effective for restoring tthe wipers T, R, S and HS and the auxiliary wipers W61 and W62 to their normal positions by completing the following energizing circuit for magnet R40: from ground through make contacts 433 on operated relay 430, break contacts 319*a* and 345 on operated relays 310 and 440, respectively, wiper W61, the N wiring which is connected to the fourth terminal of the bank A, make contacts 464 of the now-operated relay 360, make contacts 435 on operated relay 430, break contacts 414, operated off-normal contacts PON42, and the winding of release magnet R40 to battery.

When the wipers of the switch have been restored to their normal positions, the primary off-normal contacts of the switch are deenergized to reclose break contacts PON41. Responsive to the closure of contacts PON31, the previously described operating circuit for primary delay relay 440 is again established to reoperate the latter relay; responsive to the closure of contacts PON41 and the operation of register 1 relay 360, a circuit is completed for operating register 1 auxiliary relay 630 over the following circuit: from ground through make contacts 422 on operated relay 320, break contacts PON41, make contacts 463 on operated relay 360, break contacts 632, and the winding of relay 630 to battery. Relay 630 thereupon operates and completes a locking circuit for itself from battery through the winding of relay 630, now closed contacts 631, break contacts 619*a* on unoperated relay 310, and make contacts 433 on relay 430 to ground.

Register 1 and register 1 auxiliary relays 360 and 630, respectively, are a part of a means for registering a series of successive primary movements of the wipers of the selector to certain of the levels to which the selector has access. The operation of relays 360 and 630 is effective to record a first primary movement of the wipers to the fourth level which represents the first directive signal of the office code.

Responsive to the dialing of the second digit, "3," of the office code, the wipers T, R, S and HS are advanced a second time away from their normal positions to the third level to which the selector has access and the level marking means including wiper W61 is advanced to the third terminal. Assuming that the C wiring is connected to the third terminal of the bank A and that the D wiring as well as the V and Y options are omitted, a circuit is completed for reoperating release magnet R40 to record the second intermediate primary advance of the wipers to a level in which restricted trunks such as RST151 are terminated. A circuit for energizing release magnet R40 is completed responsive to a second recording operation of the registering means as follows: from ground through make contacts 433 on operated relay 430, break contacts 319*a* on released relay 310, break contacts 345 on released relay 440, wiper W61, the third terminal of the bank A, the C wiring, break contacts 622 on release delay relay, make contacts 633 on now-operated relay 630, make contacts 464 on now-operated relay 360, make contacts 435 on now-operated relay 430, break contacts 414 on released relay 310, make contacts PON42 of the primary off-normal contact, and the winding of magnet R40 to battery. The wipers T, R, S and HS and auxiliary wipers W61 and W62 thereupon are restored to their normal positions and primary delay relay 440 is reoperated in the manner previously described.

Responsive to the transmission of the third and last of the office code digits from the dial of calling station A ("8" in the example shown here), the wipers of the switch are advanced to the unlocking level which is the eighth level in the illustrated embodiment. At the conclusion of the movement of the wipers and the release of primary delay relay 440 in the previously described manner and responsive to the operation of relays 360 and 630 of the registering means, another part of the registering means comprising register 2 relay 610 is operated to complete an unlocking operation of the registering means. The operating circuit for relay 610 is completed as follows: from ground through make contacts 433 on operated relay 430, break contacts 319*a* on released relay 310, break contacts 345 on released relay 440, wiper W61, terminal 8 of the bank A, the Z wiring, make contacts 461 on operated relay 360, the winding of relay 610, break contacts 612, break contacts R41 of the interrupter contacts of the release magnet R40 to battery. Relay 610 thereupon operates and completes for itself a locking circuit from battery through now-[illegible]erated contacts 611 on relay 610, the winding of relay [illegible] contacts 515 on relay 610, break contacts 319*a* [illegible] 310, and make contacts 433 on oper-[illegible] ground.

[illegible] of register 2 relay 610 is effective to modify the previously described holding circuit for relay 360 by opening the break contacts 514. Relay 360 continues to be held operated through the primary magnet interrupter contacts P31 which were previously pointed out as being parallel to break contacts 514. The operation of relay 610 is also effective to complete a circuit for energizing the releasing means comprising release magnet R40 over the following circuit: from ground through make contacts 433 on operated relay 430, break contacts 319*a* on released relay 310, break contacts 345 on released relay 440, wiper W61, the Z wiring, make contacts 613 on operated relay 610, make contacts 464 on operated relay 360, make contacts 435 on operated relay 430, break contacts 414 on released relay 310, operated make contacts PON42 of the primary off-normal contacts, and the winding of magnet R40 to battery. The wipers of the switch release in the previously described manner.

Responsive to the release of the wipers following the recording operation of the final unlocking signal of the office code, the selector LS131 is in condition to be advanced in its primary direction responsive to the transmission of the first of the line selecting codes of the called station C line terminal code. The transmission of such a signal (the digit "9" in the example shown here) is effective to advance the wipers in the previously described manner to the ninth level.

Responsive to the unlocking operation of the registering means (an unlocking operation as indicated by the operation of relays 360, 610 and 630) and to a subsequent operation of the primary advancing means comprising magnet P40, means for energizing the hunt starting means is rendered effective in the manner next described. As the wipers are advanced in the fourth primary movement by the operation of magnet P40, the interrupter contacts of the primary magnet including break contacts P31 are opened responsive to each operation of the magnet P40 thereby opening the previously described holding circuit of relay 360, which thereupon releases. At the conclusion of the primary movement of the selector, relay 440 again releases in the previously described manner and completes responsive to the release of relay 360 an operating circuit for hunt assist relay 450 as follows: from ground through make contacts 433 on operated relay 430, break contacts 319*a* on released relay 310, make contacts 515 on operated relay 610, break contacts 462 on released relay 360, break contacts 441 on released relay 440, break contacts SON32 of the secondary off-normal springs, break contacts OF33 of the overflow springs, break contacts S41 of the secondary magnet interrupter springs, the winding of relay 450, break contacts R41 of the released magnet interrupter springs to battery. Hunt assist relay 450 thereupon operates and completes for itself a locking circuit from ground through make contacts 433 on operated relay 430, break contacts 413 on released relay 310, make contacts 452 on relay 450, break contacts S41 of the secondary magnet interrupter springs, the winding of relay 450, break contacts R41 of the released magnet interrupter springs to battery.

The operation of the hunt assist relay which comprises a part of the secondary means for advancing the wipers within any one of the levels to which the selector has access is effective for completing a circuit for energizing secondary magnet S40 as follows: from ground through make contact 433 on operated relay 430, break contacts 413 on released relay 310, make contacts 453 on operated relay 450 to battery. The operation of magnet S40 is effective to advance the wipers T, R, S and HS one step within the selected ninth level of the plurality of levels to which the selector has access and into engagement with the first set of terminals on which connectors such as LTC151 are terminated.

Upon the engagement of the wipers with any set of terminals in the selected level, the selector LS131 performs a testing operation to determine whether or not the connector terminating on the conductors engaged is in busy condition. A busy condition of the terminals being tested is indicated by the presence of ground on the conductor with which the wiper S is moved into engagement.

Operation of magnet S40 is effective to open the above described operating and locking circuits for hunt assist relay 450 at interrupter contacts S41. Relay 450 thereupon releases. The advance of the wipers away from their secondary normal position is effective to operate the secondary off-normal springs thereby opening the previously described operating circuit of hunt assist relay 450 at break contacts SON32.

In the event that a busy set of terminals is encountered by the wipers T. R. S and HS, ground is transmitted from the terminal engaged by the wiper S through break contacts 315 on unoperated relay 310, make contacts 331 on operated relay 430, break contacts OF33 of the overflow springs, break contacts S41 of the secondary magnet interrupter springs, the winding of relay 450, break contacts R41 of the release magnet interrupter springs to battery, thereby reenergizing hunt assist relay 450. Reoperation of hunt assist relay 450 is effective to reclose the previously described operating circuit for itself and for reoperating secondary magnet S40 to advance the wipers from the terminals under test into engagement with the next succeeding set of terminals in the ninth level. Magnet S40, reoperated, releases hunt assist relay 450. This process of testing and then operating the magnet S40 is repeated until the wipers T. R. S and HS have been advanced into engagement with a set of terminals on which an idle connector is terminated. Assume that such a connector is LTC151 which is shown in Fig. 1 connected to one of the sets of terminals within the ninth level by means of conductors shown collectively as C151. The idle condition is indicated by the absence of ground on the test terminal with which wiper S is engaged.

Upon encountering the absence of ground on the test terminal to which connector LTC151 is connected, a short is removed from around the operating winding of switchthrough relay 310 to allow the latter relay to operate. The short had previously been extended from wiper S through break contacts 315 on relay 310, make contacts 331 on relay 430 to the lefthand terminal of the winding of relay 310. An operating circuit for relay 310 is completed from ground through make contacts of operated relay 433, make contacts SON31 of the secondary off-normal contacts, break contacts 343 of released relay 440, the righthand terminal of switchthrough relay 310's winding, the winding of relay 310, break contacts OF33 of the overflow springs, break contacts S41 of the secondary interrupter springs, the winding of relay 450, break contacts R41 of the interrupter springs of magnet R40 to battery. Relay 310 thereupon operates in series with the winding of relay 450. The winding of relay 310 is sufficiently high resistance to prevent relay 450 from being reoperated at this time.

The operation of switchthrough relay 310 is effective for transferring the calling loop of the subscriber's line from its previously described connection to the windings of the calling bridge relay 320 to a connection over a part of the conductors shown as C151 in Fig. 1 with the calling bridge relay of the connector LTC151. Well known means in connector LTC which operate responsive to the operation of the connector's calling bridge relay are effective to cause ground to be passed back over conductor S. The disconnection of relay 320 from the group of the line of calling station A is effective to release the latter relay thereby opening the previously described operating circuit of release delay relay 430 at make contacts 421. The operation of relay 310 is effective to restore the operated relays included in the previously described registering means to their normal condition by opening the locking circuits of relays 360, 610 and 630 at break contacts 319*a* thereby restoring the registering means to its normal condition.

The operation of switchthrough relay 310 is further effective to transfer the wiper S from its connection to the hunt assist relay 450 winding at break contacts 315 to a connection to the sleeve conductor S which ground has heretofore been applied from make contacts 433 on relay 430. The previously described ground supplied to the wiper S from connector LTC is thereby extended backwardly to the line finder LF127, sleeve conductor S to the calling line circuit LC121 to hold the latter apparatus busy in the previously described manner.

The transmission of the remainder of the directive signals which comprise the remainder of the called station C line code is effective to direct the wipers of connector LTC151 to the terminals of line circuit LC151 in any of a number of well known ways. The extension of the wipers of connector LTC151 to the terminals of line circuit LC151 is effective to complete the required connection from calling station A to called station C.

It is to be noted that in the event none of the connectors such as LTC151 in the level in which the wipers T, R, S and HS are being advanced tests idle, the wipers T, R, S and HS continue to be advanced in the secondary direction in the previously described manner until they have been advanced to the overflow position. Advance of the wipers to the overflow position is effective to operate the overflow springs of the selector, thereby opening the above described energizing circuit for hunt assist relay 450 at contacts OF33. Preventing the reoperation of hunt assist relay 450 prevents the further energization of secondary magnet S40 so that a further advance of the wipers T, R, S and HS in the secondary direction is prevented.

In the case considered thus far, the class of the calling line is immaterial to the ability of the selector LS131 to extend a connection. However, in the system contemplated, the lines from which calls may be extended are divided into first and second classes. The lines of the first class are unrestricted, and are arranged to have access by way of selector LS131 to trunks terminated in certain levels which are inaccessible to lines of a second class. Lines of the first, unrestricted class are identified to the selector LS131 by the absence of ground on the HS conductor after a call has been extended from an unrestricted calling line such as A. In the case of restricted lines, such as B, a restricting ground applied to the conductor HS is effective upon the extension of a call from the calling station to the selector LS131 to operate restricting means comprising relay 520 from the ground extended through break contacts 317 on released relay 310, break contacts 531 on relay 630 and the winding of relay 520 to battery. Restricted trunks such as RPT151 shown in Fig. 1 to which access is denied from the second class of lines are found in the third level in the system under consideration.

In the system contemplated, when C wiring is included and D, V and Y wiring are omitted, it is possible to cause the selector to hunt for an idle trunk in the restricted level in case that level is selected responsive to the transmission of any one of a first group of codes. This first group includes a series of unlocking signals of the type described above and a single directive signal which causes the wipers to be moved to the restricted level without the transmission of the series of previously described unlocking signals. In the case where a call has been extended from station A to the selector LS131, the transmission of the digit "3" is effective to advance the wipers in the previously described manner to the particular level in which the restricted trunks such as RST151 are terminated. At the conclusion of the transmission of impulses, primary delay relay 440 releases in the previously described manner to complete a circuit for operating the hunt starting means comprising hunt assist relay 450 over the following circuit: from ground through make contacts 433 operated release delay relay 450, break contacts **319*a* on release delay relay 310, break contacts 345 on release relay 440, wiper W61, the C wiring which characterizes the third level, break contacts 622 on restricted service relay 520, break contacts 634 on relay 630, break contacts SON32 of the secondary off-normal springs, contacts OF33 of the overflow contact springs, break contacts S41 of the secondary magnet interrupter springs, the winding of relay 450**, break contacts R41 of release magnet interrupter contact springs to battery. Hunt assist relay thereupon operates to energize magnet S40 in the previously described manner to initiate the hunting operation in the third level which thereupon takes place in the previously described manner. The above described testing means comprising the wiper S is thereafter effective for causing the wipers to search for an absence of ground on one of the terminals in the third level which is engaged by wiper S.

In the case where calling station A first transmits the previously described unlocking office code to cause an unlocking operation of the registering means in the previously described manner followed by the subsequent transmission of a directive signal which causes the wipers to be advanced to the restricted (third) level is next described. The unlocking operation of the registering means takes place in the previously described manner. Following the transmission of the subsequent level selecting digit "3," the previously described circuit for operating the hunt assist relay 450 is completed from ground supplied through make contacts 515 on operated register 2 relay 610, break contacts 462 on released register 1 relay 462, the break contacts 441 on released relay 440 and thence to the winding of the hunt assist relay. The switch is then caused to hunt in the previously described manner.

In the event that a call has been extended from a station of the second class of lines, such as B, to the selector L1S, the restricting means comprising relay 520 is operated in the previously described manner. It is required that the wipers T, R, S and HS be prevented from hunting for an idle trunk, such as RST151, in the restricted third level when the level containing the restricted service trunks is dialed without the preliminary transmission of the unlocking series of signals or after the transmission of an unlocking series of signals has been transmitted to selector LS131. Thus, responsive to the operation of restricting service relay, the primary advance of the wipers T, R, S and HS to the third level and the corresponding advance of the level marking means including wiper W61 to the third terminal is effective to extend ground from make contacts 433, break contacts **319*a* on released relay 310, break contacts 345 on released relay 440, wiper W61, the C wiring, and make contacts 621 to the conductor to which the S wiper is directly connected. The clamping of the above traced ground connection to the sleeve wiper S conductor is effective to operate the hunt assist relay 450** over the previously traced testing circuit as though each of the sets of conductors engaged by wipers T, R, S and HS were busy. Thus, the secondary means is effective in the previously described manner to move the wipers to the overflow position and thereby prevent the selector LS131 from hunting for an idle one of the restricted service trunks, such as RST151.

In the event that an attempt is made to extend a connection from the calling station B of the restricted class of lines following the transmission of a series of unlocking digits which are effective to cause an unlocking operation of the registering means in the previously described manner, the ground is again clamped to the conductor of the S wiper over the previously traced circuit with the above noted effects. This again prevents the secondary means from hunting within restricted level 3 and the consequent extension of a connection from a restricted class of lines to the restricted service trunks, such as RST151.

It is to be noted that the unlocking operation of the registering means is brought about by the transmission of a plurality of unlocking signals; and that these signals include an intermediate signal which is effective to advance the wipers of the switch to the restricted third level. In order to prevent the restricting means from being effective in the previously described manner during the transmission of the series of unlocking signals, means comprising contacts on register 1 auxiliary relay 630 are effective to render the restricting means ineffective by opening the operating circuit of relay 520 at opened contacts 531. Thus, responsive to the first recording operation of the registering means, the release of relay 520 is effective to open the previously traced clamping ground circuit of hunt assist relay 450 at contacts 621.

During the remainder of the recording operation of the office code signals by the registering means which takes place in the previously described manner, the operation of register 2 relay 610 at the conclusion of the registering of the third unlocking signal operates means comprising make contacts 513 on relay 610 which are effective for reoperating restricted service relay 520 over the previously traced operating circuit. Following the unlocking operation of the registering means, restricting relay 520 is made effective for causing the testing means to advance the wipers T, R, S and HS to the overflow position in the previously described manner.

The system thus far described is for use with the first group of codes of which the first three of a total of seven selective signals or digits required to extend a call to a subscriber's line in the local office are effective to unlock the local first selector shown in Figs. 3–6. This selector may be adapted for use in a system in which a second group of codes comprising signals, only the first two of which are used to unlock the local first selector; in the latter system the selective signal or digit required to advance the wipers of the local first selector to the restricted trunk level is not included in the unlocking series of signals. In such a system it is desirable to have the restricted service levels accessible after the transmission of either the first office code digit or the restricted level digit into the selector. For the purpose of description, assume that the code used to unlock the selector is represented by the digits "48" and that the restricted trunk level is represented by the digit "3." Thus, the code of a called subscriber's station such as C might be 489XX, where the letters "X" denote digits which are effective to move the set of wipers associated with connector LTC151 into engagement with the terminals of line circuit LC151; the code required to cause the wipers of the local first selector to hunt within the restricted trunk level is either 43 or 33.

In order to adapt the local first selector shown in Figs. 3–6 for use in the last described system, the optional Y wiring is included and D wiring is substituted for the optional C wiring in the event that the restricted service level code is to be 43; in the event that the restricted service level code is to be 33 the last described substitution is made and, in addition, the optional V wiring is extended to the third terminal of bank B.

Thus, in a five digit system the transmission of a first directive signal comprising the digit "4" is effective to operate the registering means in the previously described manner by operating register 1 relay 360 and register 1 auxiliary relay 630. The use of optional V wiring accomplishes this first recording operation of the registering means in the event that the first directive signal dialed is the digit "3" in an obvious manner. The releasing means comprising magnet R40 is operated as previously described.

The second digit dialed, in the event that the call is directed to a subscriber line station, such as C, is the digit "8." Such a signal is effective to advance the set of wipers to the level 8; the advance of the wipers to level 8 operates register 2 relay 610 and release magnet R40 in the previously described manner. The registering means is now in condition to cause the secondary means comprising hunt assist relay 450 and secondary magnet S40 to be operated in response to the next advance of the wipers to any one of the levels accessible to the wiper set in the previously described manner.

In the event that the second signal transmitted from a line of the unrestricted class, such as A, to the selector had advanced the wiper set of the selector to the restricted level (i. e., the digit "3"), a circuit for energizing the winding of hunt assist relay 450 is completed from ground through make contacts 433, break contacts 319 and 345, wiper W61, the D wiring, make contacts 635, break contacts 624, SON32, OF33 and S41. The secondary means comprising hunt assist relay 450 and magnet S40 are thereafter operated in the previously described manner to advance the wiper set within the third, restricted level in a hunting operation.

Had the call been extended to the selector LS131 from a line of the second class, restricted service relay 520 is operated in the manner previously described. Operation of relay 520 is effective to open the above described operating path for relay 450 at contacts 624 and connects the ground supplied over the D wiring to the testing conductor connected to wiper S at contacts 623. This is effective in the previously described manner to clamp a ground connection to the sleeve wiper W conductor and thereby prevent the secondary means from hunting for an idle trunk in the level; it also causes the secondary means to advance the wipers T, R, S and HS to the overflow position.

While I have shown and described a specific embodiment of my invention, other modifications will readily occur to those skilled in the art. I do not, therefore, desire my invention to be limited to the specific arrangement shown and described, and I intend in the appended claims to cover all modifications within the spirit and scope of my invention.

What is claimed is:

1. In a telephone system, a selector comprising a switch including a set of wipers having a normal position and a plurality of levels of contacts disposed for engagement by said wiper set and including a particular level, means for transmitting directive signals to said selector, means in said selector responsive to the receipt of directive signals for moving said wiper set in a primary direction to any one of said levels, means for selectively restoring said set of wipers to said normal position following selected primary movements, means for advancing said wiper set in a secondary direction within said any one level, means operative in response to each of a series of successive primary movements of said wiper set to certain of said levels for operating said restoring means and for registering each of said series of movements and thereafter operative in response to a subsequent primary movement of said wiper set to said any one level for rendering said secondary means operative, and other means operative in response to the first registering operation of said registering means and to a subsequent primary movement of said wiper set to said particular level for rendering said secondary means operative.

2. The system set forth in claim 1 wherein said registering means is responsive to a series of primary movements of said wiper set including a first movement to said particular level.

3. In a telephone system, a selector comprising a switch including a set of wipers having a normal position and a plurality of levels of contacts disposed for engagement by said wiper set including a particular level, a plurality of lines including lines of a first class and lines of a second class, means for extending a connection from any one of said lines to said selector, means for transmitting directive signals to said selector, means in said selector responsive to the receipt of directive signals for moving said wiper set in a primary direction to any one of said levels, means for selectively restoring said wiper set to said normal position after selected primary movements, means for advancing said wiper set in a secondary direction within said any one level in a hunting operation, means operative in response to each of a series of successive primary movements of said wiper set to certain of said levels for operating said restoring means and for registering each of said series of movements and thereafter operative in response to a subsequent primary movement of said wiper set to said any one level for rendering said secondary means operative, other means operative in response to the first registering operation of said registering means and to a subsequent primary movement of said wiper set to said particular level for rendering said secondary means operative, and responsive means operative in response to the extension of a connection from any one of said second class of lines to said selector and to the first registering operation of said registering means for preventing said secondary means from causing said set of wipers to hunt in said particular level, whereby said wiper set may be caused to advance within said particular level with or without the registration of said series of primary movements in the case of connections extended from any one of said first class of lines and said wiper set is prevented from hunting within said particular level following the registration of the first of said series of primary movements in the case of connections extended to said selector from any one of said second class of lines.

4. The system set forth in claim 3 wherein said registering means is operative in response to a series of primary movements of said wiper set including a first movement to said particular level.

5. In a telephone system, a group of lines, a selector comprising a switch including a set of wipers having a normal position and a plurality of levels of contacts disposed for engagement by said wipers, said plurality of levels including a particular level, means for extending a connection from any one of said lines to said selector, means for transmitting directive signals to said selector, means operative in response to the receipt of a series of directive signals for causing a corresponding series of primary movements of said set of wipers to certain of said levels, means responsive to said primary movements of said set of wipers to certain of said levels including an intermediate advance to said particular level for registering each signal of said series, means operative in response to each operation of said registering means for restoring said set of wipers to said normal position, means for advancing said set of wipers in a secondary direction within any one of said levels in a hunting operation, means operative in response to the registration of said series of signals by said registering means and to the subsequent movement of said set of wipers to said any one level for operating said secondary means, other means operative in response to a movement of said set of wipers to said particular level for operating said secondary means, and means operative in response to an operation of said registering means preceding the operation caused by said intermediate movement of said set of wipers to said particular level for rendering said other means ineffective, whereby said wipers may be caused to hunt within said particular level without the transmission of an unlocking series of directive signals and within said any one level following the transmission of an unlocking series of directive signals.

6. In a telephone system, a group of lines comprising lines of a first class and lines of a second class, a selector comprising a set of wipers having a normal position and a plurality of levels of contacts disposed for engagement by said set of wipers, said plurality of levels including a particular level, means for extending a connection from any one of said lines to said selector, means for transmitting directive signals to said selector, means operative in response to the receipt of a series of directive signals for causing a corresponding series of primary movements of said set of wipers to certain of said levels, means responsive to said primary movements of said set of wipers to certain of said levels including an intermediate advance to said particular level for registering each signal of said series, means operative in response to each operation of said registering means for restoring said set of wipers to said normal position, means for advancing said set of wipers in a secondary direction within any one of said levels in a hunting operation, means operative in response to the registration of said series of signals by said registering means and to the subsequent movement of said set of wipers to said any one level for operating said secondary means, other means operative in response to a movement of said set of wipers to said particular level for operating said secondary means, means operative in response to an operation of said registering means preceding the operation caused by said intermediate movement of said set of wipers to said particular level for rendering said other means inoperative, restricting means operative in response to the extension of a connection from any one of said lines of said second class to said selector and to the advance of said set of wipers to said particular level for rendering said secondary means ineffective to cause a hunting operation and said other means inoperative, whereby said set of wipers may be caused to hunt in said particular level without the transmission of said unlocking series of directive signals and in said any one level following the transmission of said unlocking series of signals in the case of calls extended from any one of said first class of lines to said selector, and said set of wipers is prevented from hunting in said particular level prior to the transmission of said unlocking series of signals in the case of connections extended to said selector from any one of said second class of lines.

7. The system set forth in claim 6 and having in addition: means operative in response to an operation of said registering means preceding the one caused by said intermediate movement of said set of wipers to said particular level for rendering said restricting means inoperative, and means operative in response to the operation of said registering means caused by the intermediate movement of said set of wipers to said particular level for rendering said restricting means operative, whereby said series of directive signals may include an intermediate signal which is effective to cause a primary movement of said set of wipers to said particular level, and said set of wipers is prevented from hunting in said particular level selected before or following the transmission of said unlocking series of signals in the case of a connection extended from any one of said second class of lines.

8. In a telephone system, a group of lines comprising lines of a first class and lines of a second class, a selector comprising a set of wipers having a normal position and an overflow position and a plurality of levels of contacts disposed for engagement by said set of wipers, said plurality of levels including a particular level, means for extending a connection from any one of said lines to said selector, means for transmitting directive signals to said selector, means operative in response to the receipt of a series of directive signals for causing a corresponding series of primary movements of said set of wipers to certain of said levels, means responsive to said primary movements of said set of wipers to certain of said levels including an intermediate advance to said particular level for registering each signal of said series, means operative in response to each operation of said registering means for restoring said wipers to said normal position, means for advancing said set of wipers in a secondary direction within any one of said levels in a hunting operation, means operative in response to the registration of said series of signals by said registering means and to a subsequent advance of said wipers to said any one level for operating said secondary means, other means operative in response to a movement of said wipers to said particular level for operating said secondary means, means operative in response to an operation of said registering means preceding the operation caused by said intermediate movement of said set of wipers to said particular level for rendering said other means inoperative, and means operative in response to the extension of a connection from any one of said lines of said second class to said selector and to the movement of said set of wipers to said particular level for causing said secondary means to advance said wipers to said overflow position whereby said wipers may be caused to hunt in said particular level without transmission of said unlocking series of signals and in said any one level after the transmission of said unlocking series of signals in the case of a connection extended from any one of said first class of lines to said selector, and said wipers are advanced to said overflow position after the selection of said particular level in the case of a connection extended from any one of said second class of lines to said selector.

9. The system set forth in claim 8 and having in addition: means operative in response to an operation of said registering means preceding said intermediate operation of said registering means for rendering said restricting means inoperative, and means operative in response to said intermediate operation of said registering means for rendering said restricting means operative, whereby said unlocking series of directive signals may include an intermediate signal which is effective to cause a primary movement of said wipers to said particular level, and said wipers are prevented from hunting in said particular level selected before or following the transmission of said unlocking series of signals in the case of a connection extended from any one of said second class of lines.

10. In a telephone system, a group of lines, a selector comprising a set of wipers having a normal position and a plurality of levels of contacts disposed for engagement by said set of wipers, said plurality of levels including first, second and third particular levels, means for extending a connection from any one of said lines to said selector, means for transmitting directive signals to said selector, means operative in response to the receipt of directive signals for causing a corresponding primary movement of said set of wipers to any one of said levels, means responsive to first, second and third successive primary movements of said wipers to said first, said second and said third particular levels, respectively, for registering each of said series of signals, means operative in response to each operation of said registering means for restoring said set of wipers to said normal position, means for advancing said wipers in a secondary direction within any one of said levels in a hunting operation, means operative in response to the registration of said series of signals for operating said secondary means, other means operative in response to a primary movement of said set of wipers to said second level for operating said secondary means, and means operative in response to said first operation of said registering means for rendering said other means ineffective, whereby said wipers are caused to hunt within said second particular level without the transmission of said unlocking series of directive signals and within said any one level following the transmission of said series of directive signals.

11. In a telephone system, a group of lines comprising lines of a first class and lines of a second class, a selector comprising a set of wipers having a normal position and a plurality of levels of contacts disposed for engagement by said set of wipers and including first, second and third particular levels, means for extending a connection from any one of said lines to said selector, means for transmitting directive signals to said selector, means operative responsive to directive signals for moving said set of wipers in a primary direction to any one of said levels, means operative in response to first, second and third successive primary movements of said set of wipers to said first, said second and said third particular levels, respectively, for registering each of a series of directive signals, means operative in response to each operations of said registering means for restoring said wipers to said normal position, means for advancing said set of wipers within any one of said levels, means operative in response to the registration of said series of signals by said registering means and to the subsequent movement of said set of wipers to said any one level for operating said secondary means, other means responsive to a primary advance of said wipers to said second level for operating said secondary means, means operative in response to said first operation of said registering means for rendering said other means ineffective, means operative in response to the extension of a connection from any one of said lines of said second class for rendering said secondary means ineffective to cause said set of wipers to hunt and for rendering said other means inoperative, whereby said wipers may be caused to hunt in said second particular level without the transmission of said unlocking series of signals and in said any one level following the transmission of said unlocking series of signals in the case of calls extended from any one of said first class of lines and said wipers are prevented from hunting in said second particular level in the case of calls extended to said selector from any one of said second class of lines.

12. The system set forth in claim 11 and having means operative in response to said first operation of said registering means for rendering said restricting means inoperative, and means operative in response to said second recording operation of said registering means for rendering said restricting means operative, whereby said series of signals may include a second signal which is effective to cause a primary movement of said wipers to said second level and whereby said wipers are prevented from hunting within said second level following an unlocking operation of said registering means in the case of calls extended to said selector from any one of said second class of lines.

13. In a telephone system, a group of lines comprising lines of a first class and lines of a second class, a selector comprising a set of wipers having a normal position and a plurality of levels of contacts disposed for engagement by said set of wipers and including a particular level, means for extending a connection from any one of said group of lines to said selector, means for transmitting directive signals to said selector for moving said set of wipers in a primary direction to any one of said levels, means operative in response to each of a series of successive primary movements of said set of wipers to certain of said levels including an intermediate movement to said particular level for registering each of a series of movement-causing signals, means responsive to each operation of said registering means for restoring said set of wipers to said normal position, means operative in response to the registration of said series of signals by said registering means for advancing said set of wipers in a secondary direction within any one of said levels, other means operative in response to a primary movement of said set of wipers to said particular level for operating said secondary means, means for preventing said secondary means from causing said set of wipers to hunt, and means operative in response to an operation of said registering means preceding the operation caused by said intermediate movement of said set of wipers to said particular level for rendering said restricting means inoperative, whereby said series of primary movements may include an intermediate movement to said particular, restricted level without disabling said secondary means.

14. The system set forth in claim 13 and having in addition: means operative in response to one of said operations of said registering means following said preceding operation of said registering means for rendering said hunt preventing means effective, whereby said hunt preventing means is effective either before or after the transmission of said series of directive signals.

15. In a telephone system, a group of lines comprising lines of a first class and lines of a second class, a selector comprising a set of wipers having a normal position and an overflow position and a plurality of levels of contacts disposed for engagement by said set of two wipers including a particular level, means for extending a connection from any one of said group of lines to said selector, means for transmitting directive signals to said selector, means operative in response to directive signals for moving said set of wipers in a primary direction to any one of said levels, means operative in response to each of a series of primary movements of said set of wipers to certain of said levels including an intermediate movement to said particular level for registering each of a corresponding series of movement causing directive signals, means operative in response to each recording operation of said registering means for restoring said wipers to said normal position, means for advancing said set of wipers in a secondary direction within any one of said levels, means operative in response to the registration of said series of signals by said registering means for operating said secondary means, means operative in response to the extension of a connection from any one of said second class of lines to said selector and to a primary movement of said wipers to said particular level for causing said secondary means to advance said set of wipers to said overflow position, means operative in response to a recording operation of said registering means preceding the operation caused by said intermediate movement of said wipers for rendering said overflow advancing means inoperative, whereby said secondary means is prevented from advancing said wipers to said overflow position following a primary advance of said wipers to said particular level during said series of recording operations of said registering means in the case of a connection extended to said selector from any one of said second class of lines.

16. The system set forth in claim 15 and having in addition: means operative in response to a recording operation of said registering means subsequent to said preceding recording operation of said registering means for rendering said restricting means operative, whereby said secondary means is effective to advance said set of wipers within said particular level to said overflow position before or after an unlocking operation of said registering means in the case of a connection extended to said selector from a line of said second class.

17. In a telephone system, a group of lines comprising lines of a first class and lines of a second class, a selector comprising a set of wipers having a normal position and an overflow position and a plurality of levels of contacts disposed for engagement by said set of wipers including first, second and third particular levels, means for extending a connection from any one of said groups of lines to said selector, means for transmitting directive signals to said selector, means operative in response to the receipt of directive signals by said selector for moving said wipers in a primary direction to any one of said levels, means operative in response to each of a first, a second and a third successive primary movement of said set of wipers to said first, said second and said third levels, respectively, for registering corresponding first, second and third movement-causing directive signals, means operative in response to each operation of said registering means for restoring said set of wipers to said normal position, means for advancing said set of wipers in a secondary direction within said any one level, means operative in response to the extension of a connection from any one of said lines of said second class and to the advance of said wipers to said second level for causing said secondary means to advance said wipers to said overflow position, and means operative in response to said first operation of said registering means for rendering said restricting means inoperative, whereby said secondary means is prevented from advancing said wipers to said overflow position following a primary advance of said wipers to said particular levels during said series of recording operations of said registering means in the case of connections extended to said selector from a line of said second class.

18. The system set forth in claim 17 and having means operative in response to said second operation of said registering means for rendering said restricting means operative, whereby said secondary means is effective to advance said set of wipers within said particular level to said overflow position before or after an unlocking operation of said registering means in the case of a connection extended to said selector from a line of said second class.

No references cited.